Jan. 8, 1935.  F. BACKENECKER  1,987,318
DEVICE FOR MAKING ROLLS OF SLICED HAM
Filed April 5, 1933
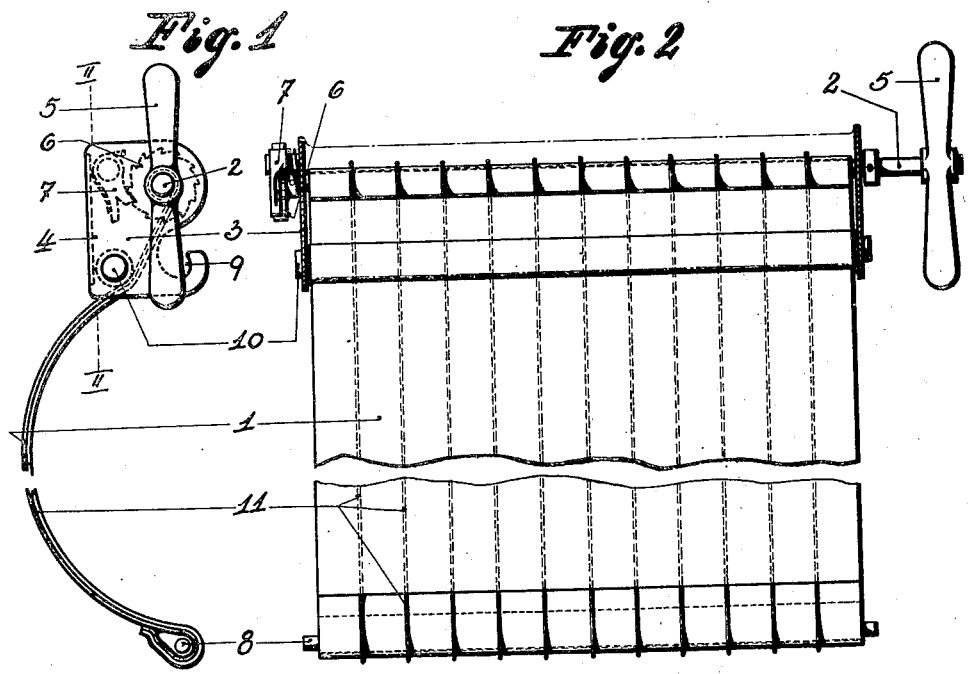
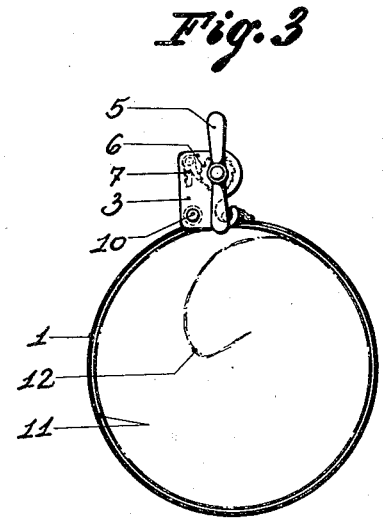
Inventor:
Fritz Backenecker Patented Jan. 8, 1935

1,987,318

UNITED STATES PATENT OFFICE 1,987,318

DEVICE FOR MAKING ROLLS OF SLICED HAM

Fritz Backenecker, Dusseldorf, Germany

Application April 5, 1933, Serial No. 664,621

1 Claim. (Cl. 100—57)

The object of the present invention is to obtain a device for the convenient making up of sliced ham into rolls, and the invention consists in the provision of a frame carrying a rotatable shaft, an apron connected at one end to said shaft and fitted at its free end with a rigid, projecting rod adapted to be supported in the frame by means of its projecting ends, means being provided for rotating the shaft so as to stretch the apron about the ham roll, as well as means for retaining the shaft with the apron, in stretched position.

Fig. 1 of the accompanying drawing represents a side view of a device according to the invention, Fig. 2 is a front view of the device in section on the line II—II of Fig. 1, and Fig. 3 is a side view of the device in operation.

The device comprises a U-shaped frame 4 of sheet metal in the end members 3 of which a shaft 2 is rotatably mounted. Connected to the shaft 2 is an apron 1 made of strong linen or other permeable substance suitable for enclosing and shaping the ham roll. The free end of the apron carries a metal rod 8 the ends of which project from the apron and are adapted to engage in notches 9 in the frame members 2 for supporting the rod in the latter. A rod 10 in the frame serves as a guide for the apron and as a reinforcement for the frame. The shaft carries an operating handle 5 and a ratchet wheel 6, the latter being engaged by a detent pawl 7.

The ham 7 is rolled up in the usual manner and, instead of being tied up with string as usual, it is enclosed in the apron 1, the rod 8 being placed in the notches 9 of the frame. Then the shaft is rotated for stretching the apron about the ham roll and giving the latter its proper shape, the shaft being retained by the pawl 7 with the apron in tensioned position. The ham roll is left in the device until its shape is fixed and it may be subjected, while in the device to cooking and curing operations.

In order to imitate the marks of the usual string ties, the apron 1 may be provided with ribs 11 running either parallel or at an angle to the edges of the apron.

I claim:

A device for making rolls of sliced ham, comprising a frame having parallel end members each provided with a notch, a shaft mounted rotatably in said members above the notches, an apron connected at one end to said shaft, a rigid rod connected to the free end of the apron and adapted to engage with its ends in the notches of said frame members, means for winding the apron on the shaft, means for preventing rotation of the shaft, and a rod connected rigidly to the end members of the frame behind the notches as a guide for the apron.

FRITZ BACKENECKER.